United States Patent
Bills et al.

(10) Patent No.: US 6,941,322 B2
(45) Date of Patent: Sep. 6, 2005

(54) METHOD FOR EFFICIENT RECORDING AND MANAGEMENT OF DATA CHANGES TO AN OBJECT

(75) Inventors: Raymond Allen Bills, Rochester, MN (US); Jerry Leroy Von Berge, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/131,887

(22) Filed: Apr. 25, 2002

(65) Prior Publication Data

US 2003/0204479 A1 Oct. 30, 2003

(51) Int. Cl.[7] .............................................. G06F 17/00
(52) U.S. Cl. .................... 707/103 Y; 700/200
(58) Field of Search ................. 707/200, 202, 707/103 R, 103 Y; 714/15, 19; 715/530

(56) References Cited

U.S. PATENT DOCUMENTS 6,063,128 A * 5/2000 Bentley et al. ............... 703/6
6,658,596 B1 * 12/2003 Owen et al. ................ 714/16
6,714,951 B2 * 3/2004 Bills et al. ................ 707/202
6,725,444 B2 * 4/2004 Fergus ........................ 717/100

* cited by examiner

Primary Examiner—Uyen Le
(74) Attorney, Agent, or Firm—Moser, Patterson & Sheridan, LLP

(57) ABSTRACT

Embodiments of the present invention are generally directed to a method, apparatus and system for journaling an object in a file system of a computer. In one aspect, a request to make a change on the object is received. In response, a journal entry containing a set of information regarding the change is generated. The journal entry is then stored to a journal. A determination is made as to whether the object contains an indicator indicating to a journal file system to bypass storing the change to the object. If so, the journal file system bypasses storing the change to the object if the object contains the indicator.

20 Claims, 4 Drawing Sheets

METHOD FOR EFFICIENT RECORDING AND MANAGEMENT OF DATA CHANGES TO AN OBJECT

BACKGROUND OF THE INVENTION

1. Field of the Invention

The present invention generally relates to journaled file systems in digital computers, and more specifically, to journaling of objects in a file system.

2. Description of the Related Art

A digital storage device in a computer system stores the operating system software, user applications and data files. One function of the operating system is to administer data storage in the storage device. A sub-system of the operating system, namely the file system, administers data storage in the storage device by allocating data to files and directories in response to appropriate requests by a system user or by an application.

Over time, files and directories are modified in different manners. For example, directories are created and named. Files are generated and deleted and the data in a file or in one of its attributes is modified. A link from a file or a directory to an existing directory or file may be added. To maintain a history of what activity has taken place within a digital storage device, a sub-system of the file system, namely the journal file system, keeps a current record, or journal, of directories and their contents.

A journal file system (JFS) is a file system in which the digital storage device maintains data integrity in the event of an operating system crash or if the operating system is otherwise halted abnormally. The JFS maintains a journal (also known as a journal receiver) of what activity has taken place within the data area of the digital storage device. If a system crash occurs, any lost data can be reconstructed from the information contained in the journal. Through keeping a journal, i.e., journaling, the JFS keeps a record of changes made to objects that are journaled and other events that occur in the system.

In one embodiment, an object, as used herein, may generally be considered a named storage space in a file system, which consists of a set of characteristics that describe itself, and in some cases, data. Some examples of objects are programs, files, libraries, access paths, and folders. Objects have a variety of types, such as, directory, stream file, symbolic link, socket, program, module, queue, and many more.

When an object is journaled, changes made to it are stored as journal entries to a journal. Each journal entry, therefore, contains a set of information regarding the change. For example, some journal entries identify activity for a specific database record. Others identify activity for a save, open, or close operation of an object. Each journal entry further contains information that identifies the source of the activity, including, for example, the user, the job, the program, the time and the date. The journal entries stored for a journaled object, therefore, reflect the changes made to that journaled object.

As shown above, journaling provides a user with many benefits, including the ability for the user to recover the changes made to an object that have occurred since the object was last saved. However, journaling increases disk activity on the computer system, consumes additional processing time for storing the data, and consumes additional volatile system memory, all of which adversely impact the computer system's performance. As the number of objects being journaled increases, the general performance of the computer system may decrease. Additionally, current journaling methods have a tendency to hold synchronization resources (i.e., locks, semaphores) for indefinite periods of time, which increases the wait time for other system resources to complete other system tasks.

A need, therefore, exists for an improved method, apparatus and system for journaling an object of a file system on a computer system.

SUMMARY OF THE INVENTION

Embodiments of the present invention are generally directed to a method of journaling an object in a file system of a computer. In one aspect, a request to make a change on the object is received. In response, a journal entry containing a set of information regarding the change is generated. The journal entry is then stored to a journal. A determination is made as to whether the object contains an indicator indicating to a journal file system to bypass storing the change to the object. If the object contains the indicator, the journal file system bypasses storing the change to the object.

In one embodiment, the present invention is directed to a method of setting up journaling of an object in a file system of a computer. In one aspect, a command to create a journal is received. In response to the command, a journal is created. The journal is generally configured for storing a plurality of journal entries. Each journal entry is configured to contain a set of information regarding a change on the object. In another aspect, a request to start journaling the object is received. In response to receiving the request, a first attribute is created and stored within the object. The first attribute is configured to indicate to the journal file system that the object is a journaled object. A second attribute is then created and stored within the object. The second attribute is configured for indicating to the journal file system to bypass storing the change to the object.

In another embodiment, the present invention is directed to a signal bearing medium comprising a program which when executed by a processor, performs a method for journaling an object in a file system of a computer. The method comprises: receiving a request to make a change on the object; generating a journal entry containing a set of information regarding the change; storing the journal entry to a journal; and determining whether the object contains an indicator indicating to a journal file system to bypass storing the change to the object.

In yet another embodiment, the present invention is directed to a signal bearing medium comprising a program which when executed by a processor, performs a method for setting up journaling of an object in a file system of a computer. The method comprises: receiving a command to create a journal; creating a journal, in response to the command, for storing a plurality of journal entries. Each journal entry is configured to contain a set of information regarding a change on the object. The method further comprises: receiving a request to start journaling the object; and creating and storing a first attribute within the object, in response to receiving the request. The first attribute is configured to indicate to the journal file system that the object is a journaled object. The method further comprises: creating and storing a second attribute within the object. The second attribute is configured for indicating to the journal file system to bypass storing the change to the object.

In still another embodiment, the present invention is directed to a computer that includes a memory containing an object journaling program; and a processor which, when executing the object journaling program, performs an operation. The operation comprises: receiving a request to make a change on the object; generating a journal entry containing a set of information regarding the change; storing the journal entry to a journal; and determining whether the object contains an indicator indicating to a journal file system to bypass storing the change to the object.

In still yet another embodiment, the present invention is directed to a computer that includes a memory containing an object journaling set-up program; and a processor which, when executing the object journaling set-up program, performs an operation. The operation comprises: receiving a command to create a journal; creating a journal, in response to the command, for storing a plurality of journal entries. Each journal entry is configured to contain a set of information regarding a change on the object. The method further comprises: receiving a request to start journaling the object; and creating and storing a first attribute within the object, in response to receiving the request. The first attribute is configured to indicate to the journal file system that the object is a journaled object. The method further comprises: creating and storing a second attribute within the object. The second attribute is configured for indicating to the journal file system to bypass storing the change to the object.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
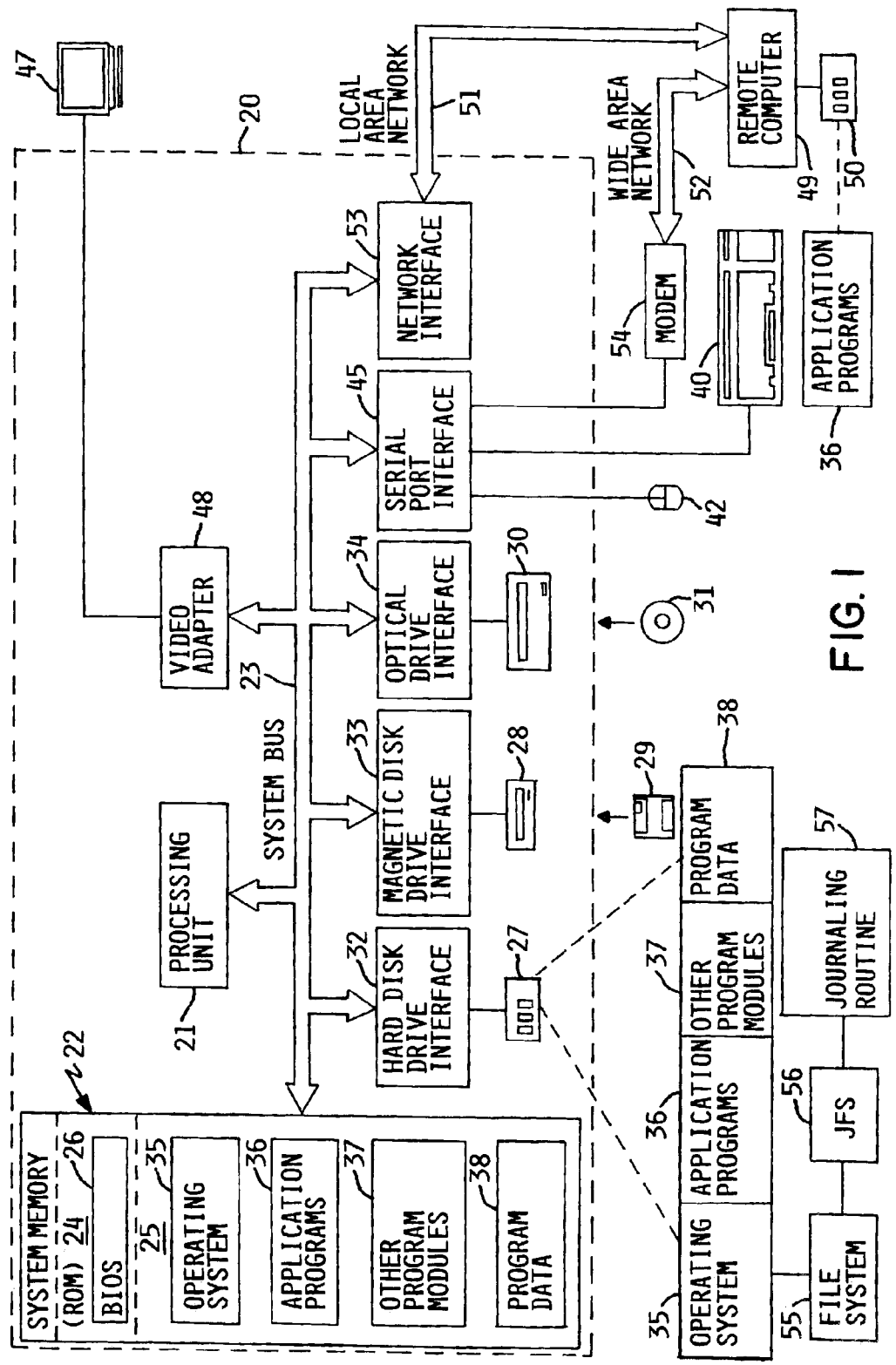
FIG. 1 illustrates a diagram of one embodiment of the hardware and operating system environment in conjunction with which embodiments of the invention may be practiced.

The present invention is generally directed to a method of journaling an object in a file system of a computer system. When a change occurs on a journaled object, the change is recorded in a journal entry stored in a journal. Typically, the change is also stored in the object. This last step, however, unnecessarily consumes the computer system resources, such as processing time, locks, system memory and permanent auxiliary storage. Embodiments of the present invention therefore provide a method in which the change is not stored in the object. In one embodiment, a determination is made as to whether the object contains an attribute indicating to the journal file system to bypass storing the change to the object. In another embodiment, a determination is made as to whether the object is of a type that indicates to the journal file system to bypass storing the change to the object. If either condition exists, the journal file system will only store the change in a journal entry to the journal, and not to the object itself. In this manner, embodiments of the present invention provide a journaling method that conserves computer system resources. The stored change in the entry may then be retrieved on the fly by a local application or a remote application for data processing or replication to other media.

One embodiment of the invention is implemented as a program product for use with a computer such as, for example, the computer 20 shown in FIG. 1 and described below. The program(s) of the program product defines functions of the embodiments (including the methods described below with reference to FIGS. 2 and 3) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 shows one embodiment of a computer 20. In general, the computer 20 comprises a processing unit 21, a system memory 22, and a system bus 23 that operatively couples various system components, including the system memory 22, to the processing unit 21. The computer 20 may include more than one processing unit. In one embodiment, the computer 20 includes a plurality of processing units, commonly referred to as a parallel processing environment. The computer 20 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes a read only memory (ROM) 24 and a random access memory (RAM) 25. A basic input/output system (BIOS) 26, containing the basic routines that help to transfer information between elements within the computer 20, such as during start-up, is stored in the ROM 24. The computer 20 further includes a hard disk drive 27 for reading from and writing to a hard disk, a magnetic disk drive 28 for reading from and writing to a removable magnetic disk 29, and an optical disk drive 30 for reading from or writing to a removable optical disk 31, such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of signal-bearing media which can store data that is accessible by a computer, such as magnetic cassettes, flash memory cards, digital video disks, random access memories (RAMs), read only memories (ROMs), and the like, may be used in the exemplary operating environment.

A number of program modules and data structures may be stored on the media readable hard disk drive 27, magnetic disk drive 28, optical disk drive 30, ROM 24, or RAM 25. Illustrative programs and data structures include an operating system 35, one or more application programs 36, other program modules 37, and program data 38.

In one embodiment, the operating system 35 comprises a file system 55, a journal file system (JFS) 56, and a journaling routine/program 57. The operating system 35 administers data storage of objects on a signal-bearing media using the file system 55. The file system 55 allocates the storage of objects to files and directories. The JFS 56, in combination with the journaling routine 57, administers journaling of objects stored by the file system 55. In one embodiment, the JFS 56 includes one or more journals, such as a journal 250 (shown in FIG. 3). One embodiment of a method performed by the journaling routine 57 is described below with reference to FIGS. 2–4.

Illustratively, the file system 55, the JFS 56 and the journaling routine 57 are part of the operating system 35. In another embodiment, however, journaling routine 57 may be a stand-alone program module included in the program modules 37.

A user may enter commands and information into the personal computer 20 through input devices, such as, a keyboard 40 and a pointing device 42. These and other devices are often connected to the processing unit 21 through a serial port interface 46 that is coupled to the system bus 23, but may be connected by other interfaces, such as a parallel port or a universal serial bus (USB) (not shown). A monitor 47 or other type of display device is also connected to the system bus 23 via an interface, such as, a video adapter 48. In addition to the monitor, the computer 20 may include other peripheral output, such as, speakers and printers (not shown).

The computer 20 may operate in a networked environment using logical connections to one or more remote computers, such as a remote computer 49. These logical connections are achieved by a communication device coupled to or part of the computer 20. The remote computer 49 may be another computer, a server, a router a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. The logical connections may also be other types of networks, such as, enterprise-wise computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Figure 2:
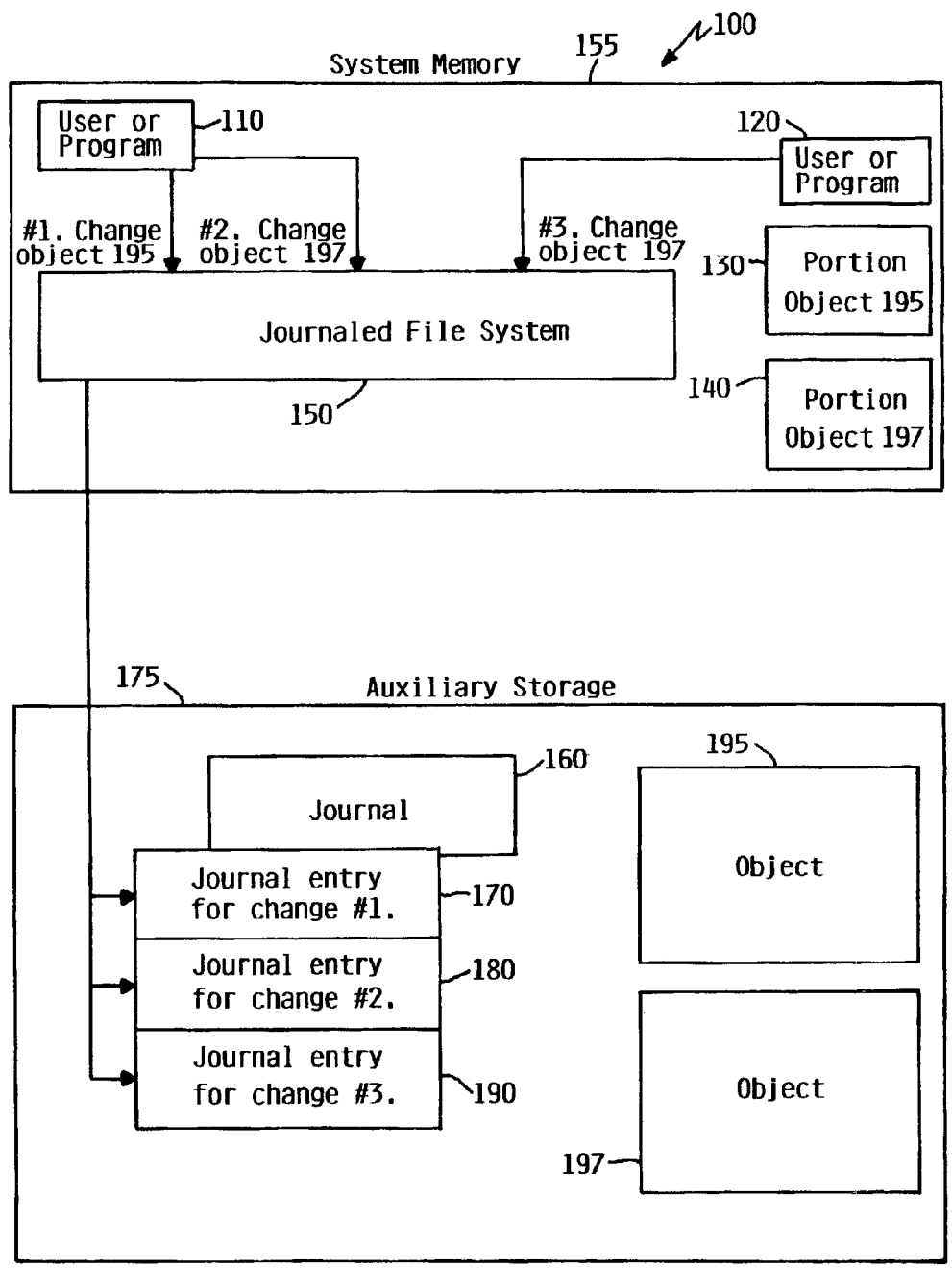
FIG. 2 illustrates a block diagram illustrating a journaling system in accordance with an embodiment of the invention.

Referring now to FIG. 2, a block diagram illustrating a journaling system 100 in accordance with an embodiment of the invention is shown. Illustratively, two objects are shown, object 195 and object 197, in an auxiliary storage 175. A portion 130 of object 195 and a portion 140 of object 197 may have been paged into memory 155. Illustratively, two entities (110, 120), which may be a user or a program, are shown to have made changes to object 195 and object 197. Entity 110 made changes on objects A and B, while entity 120 made changes on object B. In accordance with an embodiment of the invention, in response to the changes made to objects 195 and 197, the changes are sent to JFS 150 to determine that the changes should only be sent to a journal entry. That is, none of the changes will be recorded in objects 195 and 197. Instead, the changes are stored only in the journal entries of a journal in an auxiliary storage. For instance, the changes made by entity 110 to object 195 are stored in journal entry 170 of journal 160. The changes made by entity 110 on object 197 are stored in journal entry 180, while the changes made by entity 120 on object 197 are stored in journal entry 190.

Figure 3:
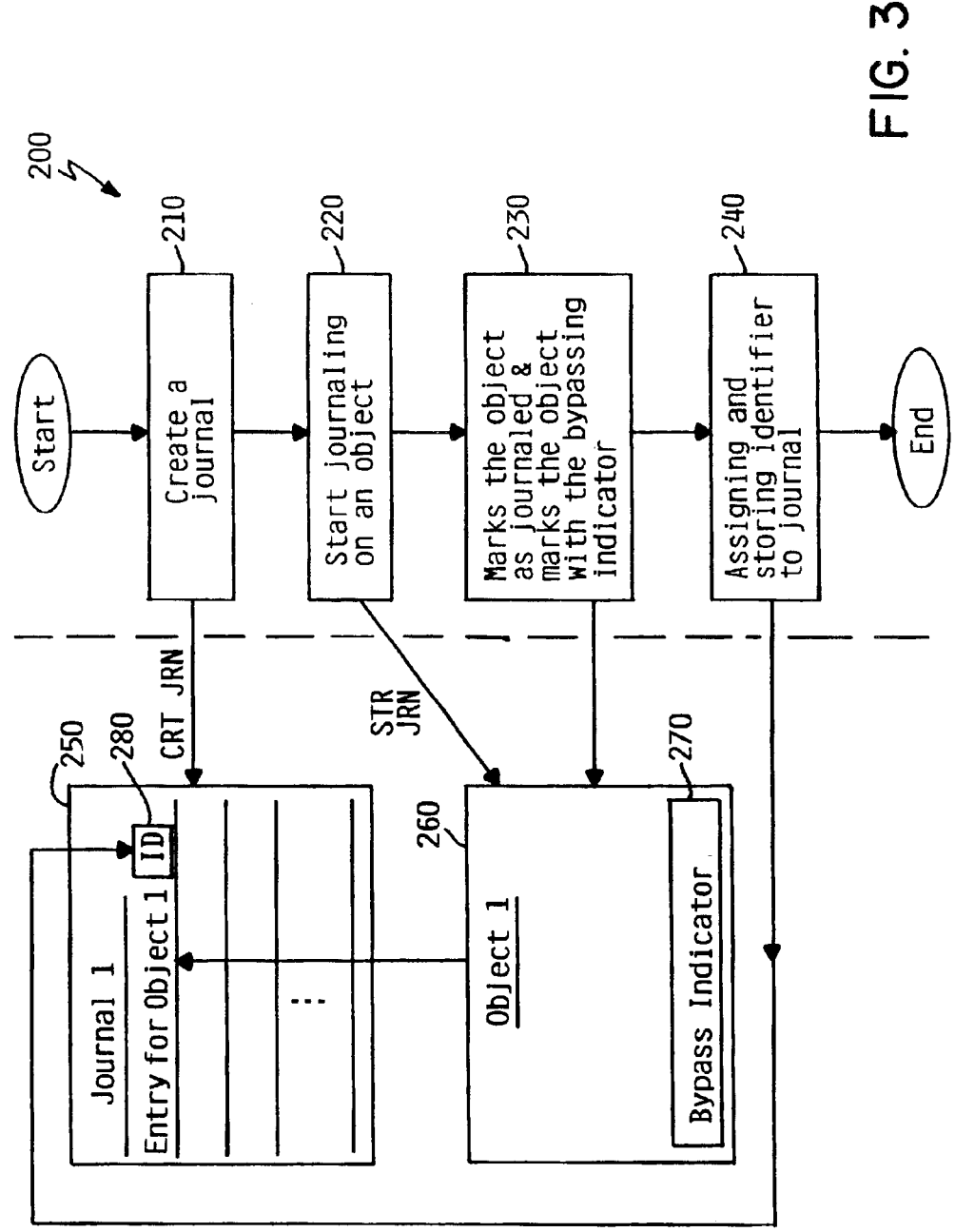
FIG. 3 is a process for setting up journaling an object in a file system according to an embodiment of the invention.

FIG. 3 illustrates a process 200 for setting up journaling of an object, 260 in the file system 55 according to an embodiment of the invention. At step 210, a command is received by the file system 55 to create a journal 250. In one embodiment, the command received is CRTJRN. In response, the journal 250 is created. The journal 250 is configured for storing a plurality of journal entries. Each journal entry is configured to contain a set of information regarding a change on the object 260. In this embodiment, a name may also be assigned to the journal, e.g., Journal1. At step 220, a request to start journaling the object 260 is received by the file system 55. In response, the JFS 56 begins the journaling process. In one embodiment, the STRJRN command is used in starting the journaling operation on the object. At step 230, an attribute indicating the object 260 as a journaled object to the JFS 56 is stored in the object. In this manner, the object 260 is marked as a journaled object. In accordance with one embodiment of the present invention, if the user has selected an attribute 270 indicating to the JFS 56 to bypass storing the change to the object 260, that attribute 270 is also stored in the object 260. In this manner, the JFS 56 will only store future changes made on the object 260 to the journal 250, and not to the object itself. At step 240, a unique journal identifier 280 is assigned to the object and the identifier 280 is then stored in the journal 250. The journal identifier 280 is part of every journal entry added to the journal for a given object. The JFS 56 uses the journal identifier 280 to associate the journal entry with the corresponding journaled object. Once the object has been set up for journaling, all changes made to that object will be stored as journal entries in the journal.

Figure 4:
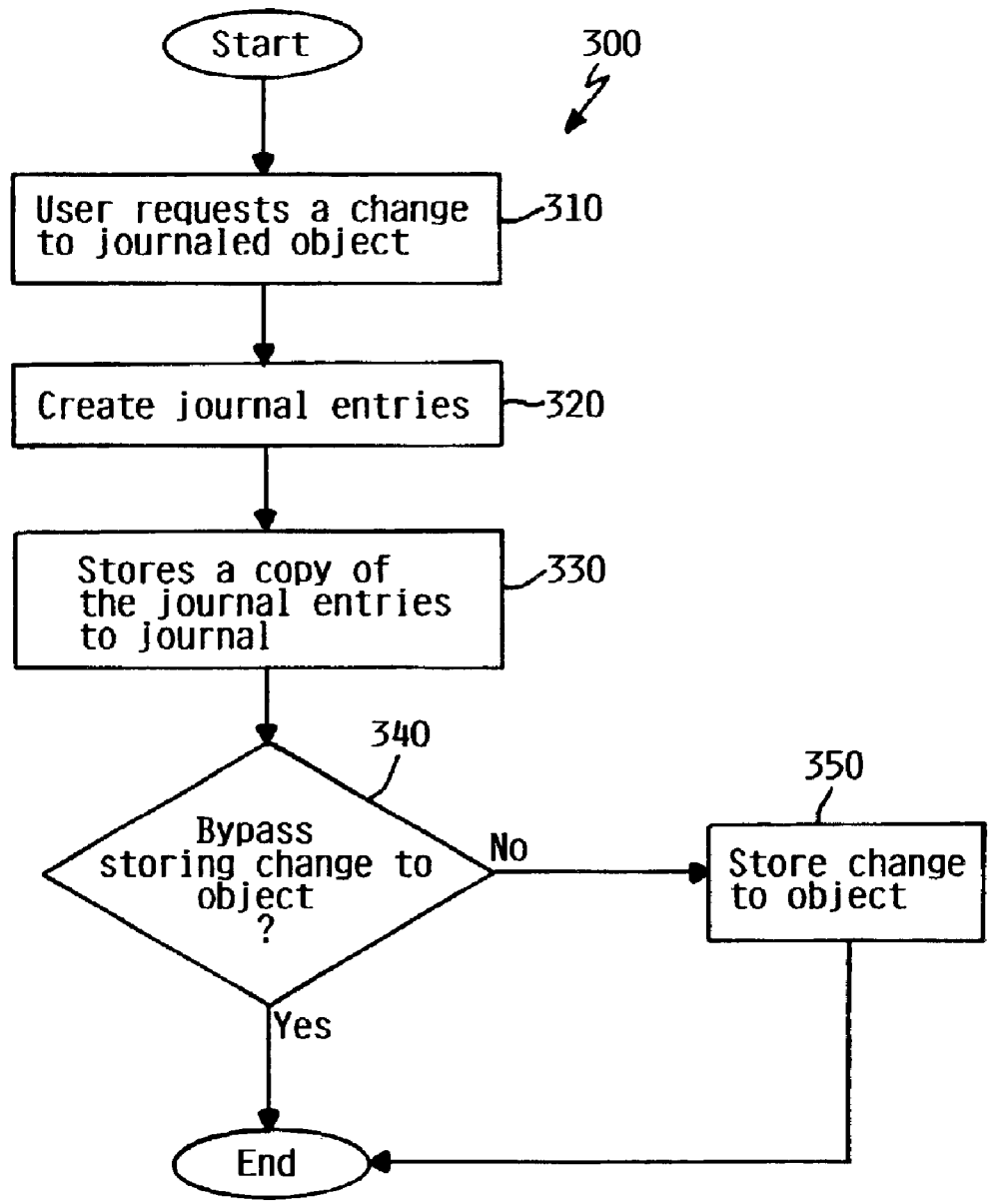
FIG. 4 illustrates a process for journaling an object of a file system in accordance with an embodiment of the present invention.

Referring now to FIG. 4, a process 300 for journaling the object 260 of the file system 55 in accordance with an embodiment of the present invention is illustrated. At step 310, a request to make a change on the journaled object is received by the file system 55. In one embodiment, the request is received from either an end user or an end user application. The change may be a data write or an attribute change, for example. At step 320, in response to the change, a journal entry is created. As mentioned above, the journal entry generally contains a set of information regarding the change, such as, information that identifies the type of change, information that identifies the data that was changed, the after-image of the data, the before-image of the data, information that identifies a job, the user, the time of change, and the journal identifier of the object. At step 330, the journal entry is stored in the journal. In one embodiment, the journal entry is also stored in a permanent auxiliary storage. At step 340, a determination is made as to whether the object 260 contains an indicator that indicates to the JFS 56 to bypass storing the change to the object. The indicator may be any type of computer readable indicator or flag. In one embodiment, that indicator is the attribute 270. In another embodiment, the indicator is an object type. If the object 260 contains an indicator that indicates to the JFS 56 to bypass storing the change to the object 260, the change will not be stored to the object 260. On the other hand, if the answer is in the negative, then the change will be stored to the object 260 (step 350).

In accordance with an embodiment of the present invention, after the journal entry is stored in the journal 250 at step 330, a copy of the journal entry may be transferred via a network to a remote journal in which the copy of the journal entry may also be stored. Alternatively, a copy of the journal entry may be used by other processes in the system.

While the foregoing is directed to embodiments of the present invention, other and further embodiments of the invention may be devised without departing from the basic scope thereof, and the scope thereof is determined by the claims that follow.

What is claimed is:

1. A computer implemented method for managing an object in a journaling file system of a computer, comprising:

receiving a request to make a change on the object;

in response to the request, generating a journal entry containing information regarding the requested change;

storing the journal entry to a journal maintained by the journaling file system; and determining whether the object contains an indicator indicating to the journaling file system to bypass writing the change to the object, wherein a presence of the indicator causes the journaling file system to bypass writing the requested change to the object, and wherein an absence of the indicator causes the journaling file system to write the requested chance to the object.

2. The method of claim 1, wherein the indicator comprises one of an attribute and an object type.

3. The method of claim 1, further comprising, bypassing writing the change to the object if the object contains the indicator.

4. The method of claim 1, further comprising, bypassing writing the change to the object if the object contains the indicator; and wherein the indicator comprises one of an attribute and an object type.

5. The method of claim 1, wherein the indicator comprises one of an attribute and an object type; and the method further comprising prior to receiving the request to make the change, storing one of the attribute and the type within the object.

6. The method of claim 1, wherein the indicator comprises one of an attribute and an object type; and the method further comprising:

prior to receiving the request to make the change, storing one of the attribute and the type within the object; and bypassing writing the change to the object if the object contains the indicator.

7. A method of setting up a journaling file system for an object stored on a storage device of a computer, comprising:

receiving a command to create a journal;

in response to the command, creating a journal for storing a plurality of journal entries, each journal entry is configured to contain a set of information regarding a requested change on the object;

receiving a request to start journaling changes requested for the object;

creating and storing, in response to receiving the request, a first attribute in the object, the first attribute indicating to the journaling file system that the object is a journaled object; and creating and storing a second attribute the object, the second attribute indicating to the journaling file system to bypass writing the requested change for the object to the object.

8. The method of claim 7, further comprising assigning a unique identifier to the object for associating the journal entry with the object; and storing the identifier in the journal.

9. A signal bearing medium comprising a program which when executed by a processor, performs a method for managing an object in a journaling file system of a computer, the method comprising:

receiving a request to make a change on the object;

in response to the request, generating a journal entry containing information regarding the requested change;

storing the journal entry to a journal maintained by the journaling file system; and determining whether the object contains an indicator indicating to the journaling file system to bypass writing the change to the object, wherein a presence of the indicator causes the journaling file system to bypass writing the requested change to the object, and wherein an absence of the indicator causes the journaling file system to write the requested change to the object.

10. The signal bearing medium of claim 9, wherein the indicator comprises one of an attribute and an object type.

11. The signal bearing medium of claim 9, further comprising, bypassing writing the change to the object if the object contains the indicator.

12. The signal bearing medium of claim 9, wherein the indicator comprises one of an attribute and an object type; and the method further comprising prior to receiving the request to make the change, storing one of the attribute and the object type within the object.

13. A signal bearing medium comprising a program which when executed by a processor, performs a method for setting up a journaling file system for an object stored in computer, the method comprising: receiving a command to create a journal;

in response to the command, creating a journal for storing a plurality of journal entries, each journal entry is configured to contain a set of information regarding a requested change on the object;

receiving a request to start journaling changes requested for the object;

creating and storing, in response to receiving the request, a first attribute in the object, the first attribute indicating to the journaling file system that the object is a journaled object; and creating and storing a second attribute the object, the second attribute indicating to the journaling file system to bypass writing the requested change for the object, to the object.

14. The signal bearing medium of claim 13, further comprising assigning a unique identifier to the object for associating the journal entry with the object; end storing the identifier in the journal.

15. A computer, comprising:

a memory containing an object-journaling program; and a processor which, when executing the object-journaling program, performs an operation comprising:

receiving a request to make a change on the object;

in response to the request, generating a journal entry containing information regarding the requested change;

storing the journal entry to a journal maintained by a journaling file system; and determining whether the object contains an indicator indicating to a the journaling file system to bypass writing the change to the object, wherein a presence of the indicator causes the journaling file system to bypass writing the requested chance to the object, and wherein an absence of the indicator causes the journaling file system to write the requested chance to the object.

16. The computer of claim 15, wherein the indicator comprises one of an attribute and an object type.

17. The computer of claim 15, wherein the operation further comprises bypassing writing the change to the object if the object contains the indicator.

18. The computer of claim 15, wherein the indicator comprises one of an attribute and an object type; and wherein the operation further comprises prior to receiving the request to make the change, storing one of the attribute and the object type within the object.

19. A computer, comprising:

a memory containing an object journaling set-up program; and a processor which, when executing the object journaling set-up program performs an operation comprising:

receiving a command to create a journal for a journaling file system;

in response to the command, creating a journal for storing a plurality of journal entries, each journal entry is configured to contain a set of information regarding a requested change to an object stored by the journaling file system;

receiving a request to start journaling changes requested for the object;

creating and storing, in response to receiving the request, a first attribute in the object, the first attribute indicating to the journal file system that the object is a journaled object; and creating and storing a second attribute the object, the second attribute indicating to the journaling file system to bypass writing the change requested for the object to the object.

20. The computer of claim 19, wherein the operation further comprises assigning a unique identifier to the object for associating the journal entry with the object and storing the identifier in the journal.

* * * * *